(12) United States Patent
Beran et al.

(10) Patent No.: US 11,602,696 B2
(45) Date of Patent: *Mar. 14, 2023

(54) ACCESS CONTROL FOR AN AUGMENTED REALITY EXPERIENCE USING INTERPROCESS COMMUNICATIONS

(71) Applicant: 7-Eleven, Inc., Irving, TX (US)

(72) Inventors: Charles Nathan Beran, Arlington, TX (US); Sajjad Mahmood Khan, McKinney, TX (US); Santhanagopalakrishnan Panchapakesan, McKinney, TX (US); Stephen Patrick Kinch, Fort Worth, TX (US); Tarang Swadeshkumar Sethia, Frisco, TX (US); Mark Hollon, Grapevine, TX (US); Maninder Singh Suri, Irving, TX (US); Manish Agarwal, Grapevine, TX (US); Gurmeet Singh, Irving, TX (US)

(73) Assignee: 7-ELEVEN, INC., Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/359,222

(22) Filed: Jun. 25, 2021

(65) Prior Publication Data

US 2021/0316224 A1 Oct. 14, 2021

Related U.S. Application Data

(63) Continuation of application No. 16/552,042, filed on Aug. 27, 2019, now Pat. No. 11,135,521.

(51) Int. Cl.
*A63F 13/79* (2014.01)
*G06Q 30/02* (2012.01)
*G06Q 30/0226* (2023.01)

(52) U.S. Cl.
CPC .......... *A63F 13/79* (2014.09); *G06Q 30/0226* (2013.01); *A63F 2300/8082* (2013.01)

(58) Field of Classification Search
USPC ......................................................... 463/25
See application file for complete search history.

(56) References Cited

U.S. PATENT DOCUMENTS

| | | | |
|---|---|---|---|
| 2015/0058144 A1* | 2/2015 | Seligstein | G06Q 20/10 705/16 |
| 2017/0173453 A1* | 6/2017 | Huang | G06F 3/011 |
| 2017/0354884 A1* | 12/2017 | Benedetto | A63F 13/493 |
| 2018/0097975 A1* | 4/2018 | Osman | H04N 5/2226 |
| 2019/0113967 A1* | 4/2019 | Tokubo | G02B 27/017 |
| 2020/0097075 A1* | 3/2020 | Tokubo | H04B 7/04 |
| 2020/0346105 A1* | 11/2020 | Huang | G06F 3/011 |
| 2021/0060439 A1 | 3/2021 | Beran et al. | |

* cited by examiner

*Primary Examiner* — Pierre E Elisca
(74) *Attorney, Agent, or Firm* — Baker Botts L.L.P.

(57) ABSTRACT

An access control system that includes an access control device configured to receive transaction information that identifies a member identifier for a member and a purchased item. The access control device is configured to compare the purchased item to items in an item list and to determine whether the purchased item matches any items in the item list. The access control device is configured to store an authorization for the member identifier to access an augmented reality experience in response to a match.

20 Claims, 6 Drawing Sheets

ACCESS CONTROL FOR AN AUGMENTED REALITY EXPERIENCE USING INTERPROCESS COMMUNICATIONS

CROSS-REFERENCE TO RELATED APPLICATIONS

This application is a continuation of U.S. patent application Ser. No. 16/552,042 filed Aug. 27, 2019, by Charles Nathan Beran et al., and entitled "ACCESS CONTROL FOR AN AUGMENTED REALITY EXPERIENCE USING INTERPROCESS COMMUNICATIONS," which is incorporated herein by reference.

TECHNICAL FIELD

The present disclosure relates generally to interprocess communications, and more specifically to using interprocess communications to provide access control for an augmented reality experience.

BACKGROUND

Existing computer systems use permission-based settings that are preconfigured to allow a user to access particular types of media content. In these systems, the media content that a user is able to access is typically preassigned and fixed. In this case, the user's permission settings will limit which media content that the user is able to access. For security reasons, these systems do not allow the user to change their own permission settings. Allowing the user to alter their own permission settings would nullify any access control that is provided by the system. This means that the user is unable to perform any actions that will allow them to access restricted media content. This also means that the system is responsible for updating permission settings any time that the system wants to modify which media content that a particular user is able to access. This poses a technical challenge in large computer systems which may serve thousands or millions of users. Modifying permission settings on a case-by-case basis for its users would consume a significant amount of processing resources and creates a bottle neck that degrades the performance of the system and its ability to perform other operations.

SUMMARY

Existing computer systems use permission-based settings that are preconfigured to allow a user to access particular types of media content. In these systems, the media content that a user is able to access is typically preassigned and fixed. In this case, the user's permission settings will limit which media content that the user is able to access. For security reasons, these systems do not allow the user to change their own permission settings. Allowing the user to alter their own permission settings would nullify any access control that is provided by the system. This means that the user is unable to perform any actions that will allow them to access restricted media content. This also means that the system is responsible for updating permission settings any time that the system wants to modify which media content that a particular user is able to access. This poses a technical challenge in large computer systems which may serve thousands or millions of users. Modifying permission settings on a case-by-case basis for its users would consume a significant amount of processing resources and creates a bottle neck that degrades the performance of the system and its ability to perform other operations.

The system disclosed in the present application provides a technical solution to the technical problems discussed above by using interprocess communications between multiple systems to provide access control. The disclosed system provides several practical applications and technical advantages which include 1) a process for using information and triggering events from other systems to provide access control to an augmented reality experience and 2) a process for distributing and verifying information about a member's interactions with different systems.

In one embodiment, an access control system includes an access control device and an augmented reality hosting device that are in signal communication with each other. The access control device is configured to receive transaction information from a point-of-sale device for a member after they make a purchase at a vendor location. The transaction information identifies a member identifier for the member and one or more purchased items. The access control device is further configured to compare the purchased items to items in the item list and to determine whether any of the purchased items match any of the items in the item list. The item list identifies a plurality of items that can be purchased to unlock an augmented reality experience in a mobile application. Examples of augmented reality experiences include, but are not limited to, games, face filters, videos, images, stories, or any other suitable type of media content. In response to determining that a purchased item matches an item in the item list, the access control device is configured to store an authorization for the member identifier to access the augmented reality experience in the account information associated with the member. The account information links the member identifier for the member with a cumulative number of session points from interacting with the augmented reality experience.

The augmented reality hosting device is configured to receive an access request for the augmented reality experience that comprises the member identifier. Here, the member may send the access request via a mobile application on the user device to request permission to interact with the augmented reality experience. The augmented reality hosting device is further configured to send a verification request that comprises the member identifier to the access control device and to receive a verification response that indicates whether the member associated with the member identifier is authorized to access the augmented reality experience. The augmented reality hosting device is further configured to enable access the augmented reality experience for the member in response to receiving a verification response that indicates that the member is authorized to access the augmented reality experience. The augmented reality hosting device is further configured to determine the number of session points earned by the member from interacting with the augmented reality experience and to send the number of session points earned by the member from interacting with the augmented reality experience to the access control device.

The access control device is further configured to receive the number of session points earned by the member from interacting with the augmented reality experience and to add the received number of session points to the cumulative number of session points for the member. The access control device is further configured to identify any rewards that the member is eligible to receive based on their cumulative number of session points using a reward map. The reward map identifies a plurality of rewards that are each linked with a number of session points for obtaining a corresponding reward. The access control device is further configured to send reward information to a user device associated with the member that comprises information for retrieving the identified reward.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Access Control System

Figure 1:
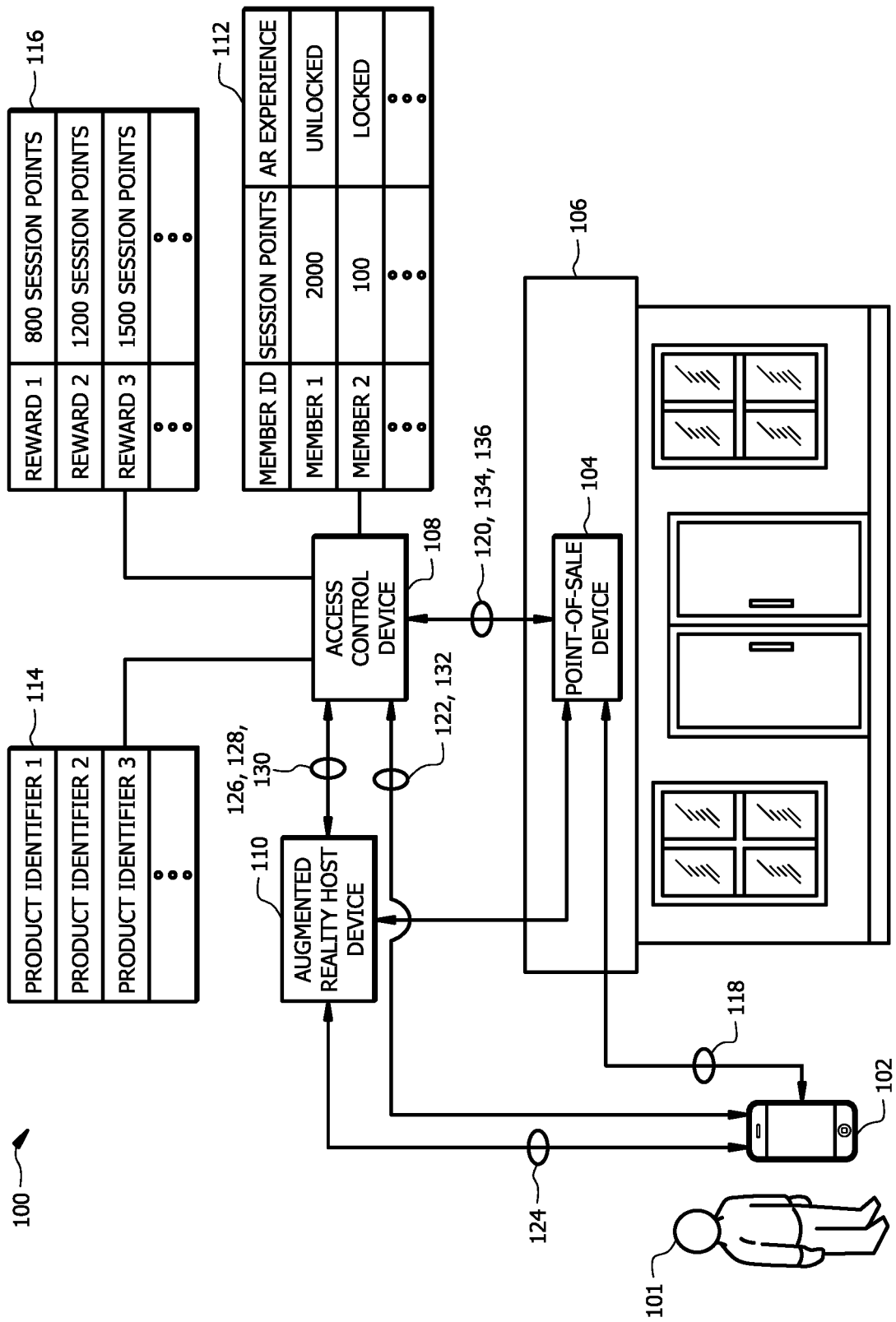
FIG. 1 is a schematic diagram of an access control system configured to use interprocess communication to provide access control for an augmented reality experience.

FIG. 1 is a schematic diagram of an access control system 100 configured to use interprocess communication to provide access control for an augmented reality experience. In one embodiment, the access control system 100 comprises a point of sale device 104, an access control device 108, and an augmented reality host device 110 that are all in signal communication with each other over a network. The network may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network may be configured to support any suitable type of communication protocol as would be appreciated by one of ordinary skill in the art. The access control system 100 may be configured as shown or in any other suitable configuration. For example, the access control device 108 and the augmented reality host device 110 may integrated into a single device in some embodiments.

Point-of-Sale Device

A point-of-sale device 104 is a hardware device that is associated with a vendor 106 that sells products and/or service. Examples of vendors 106 include, but are not limited to, retail stores, convenience stores, gas stations, grocery stores, electronic stores, or any other type of business that sells products or services. Examples of the point-of-sale devices 104 include, but are not limited to, a register, a kiosk, self-checkout terminal, a handheld scanning device, a tablet, or any other suitable type of device for facilitating a transaction. As an example, the point-of-sale device 104 may be a register located in a convenience store. As another example, the point-of-sale device 104 may be self-checkout terminal at a grocery store. The point-of-sale device 104 is generally configured to facilitate transactions for goods and/or services and to provide transaction information to the access control device 108. The point-of-sale device 104 and the access control device 108 may be in signal communication with each other using any suitable type of network connection. An example of the point-of-sale device 104 in operation is described in FIG. 2.

Augmented Reality Host Device

The augmented reality host device 110 may be any suitable type of server or other network device as would be appreciated by one of ordinary skill in the art. The augmented reality host device 110 may be formed by one or more physical devices configured to provide services and resources (e.g. data and/or hardware resources) for user devices 102, point-of-sale devices 104, and access control devices 108. The augmented reality host device 110 is generally configured to provided augmented reality services for members 101 via their user devices 102. Examples of user devices 102 include, but are not limited to, smart phones, tablets, laptop, or any other suitable type of network enabled device. For instance, a member 101 may use a mobile application on a user device 102 that is associated with the augmented reality host device 110 to access and execute an augmented reality experience on their user device 102. Examples of augmented reality experiences include, but are not limited to, games, image filters, videos, images, stories, or any other suitable type of media content. An augmented reality experience may be configured to overlay virtual or graphical objects with tangible or physical objects that are in from of a member 101. For example, an augmented reality experience may be able to overlay a cartoon character with a real scene that is in front of the member on a graphical display of the member's 101 user device. The augmented reality host device 110 and a user device 102 may be in signal communication with each other using any suitable type of network connection. An example of the augmented reality host device 110 in operation is described in FIG. 2.

Access Control Device

The access control device 108 is a network device that is associated with a vendor 106. The access control device 108 may be any suitable type of server or other network device as would be appreciated by one of ordinary skill in the art. The access control device 108 may be formed by one or more physical devices configured to provide services and resources (e.g. data and/or hardware resources) for user devices 102, point of sale devices 104, and augmented reality host devices 110. The access control device 108 is generally configured to store information associated with a member 101 and to provide access control to one or more augmented reality experiences that are offered by the augmented reality host device 110. For example, the access control device 108 may be configured to store and provide information that indicates whether a member 101 is authorized to access an augmented reality experience based on their transaction history. The access control device 108 is further configured to store information about a number of session points that a member 101 has accumulated while interacting with an augmented reality experience. The access control device 108 is configured to determine when a member 101 has accumulated enough points for a reward and may provide the member 101 with information about how to retrieve their reward. The access control device 108 may be in signal communication with a user device 102, the point-of-sale device 104, and the augmented reality host device 110 using any suitable type of network connection. An example of the access control device 108 in operation is described in FIG. 2.

Access Control Process for an Augmented Reality Experience

Figure 2:
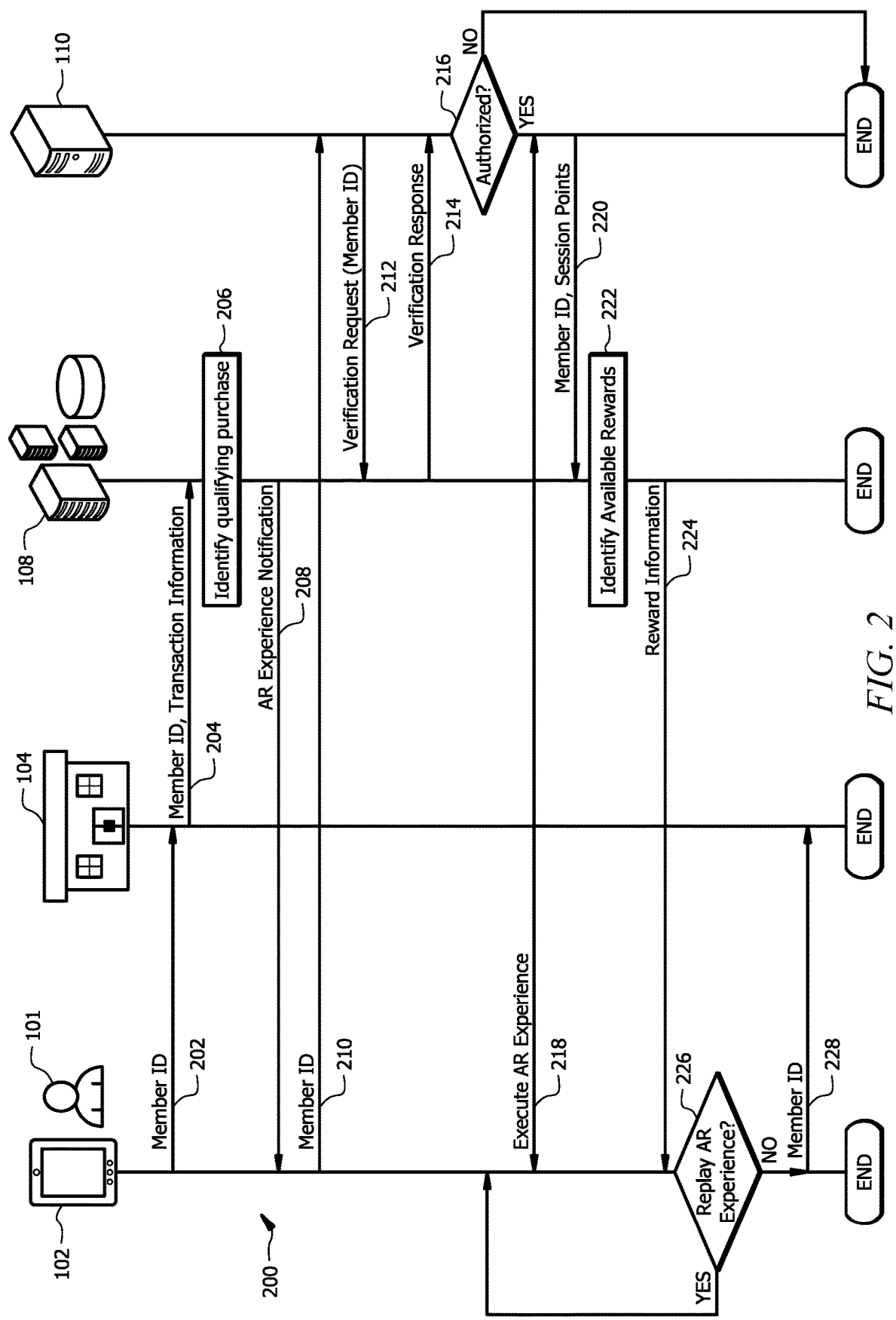
FIG. 2 is a protocol diagram of an embodiment of an access control method for an augmented reality experience.

FIG. 2 is a protocol diagram of an embodiment of an access control method 200 for an augmented reality experience. The access control system 100 may employ method 200 to provide access control to one or more augmented reality experiences in a mobile application. Method 200 allows the access control system 100 to restrict a member's 101 ability to access media content (e.g. an augmented reality experience) until they complete a task that is associated with unlocking the media content. As a non-limiting example, the access control system 100 may be configured to restrict access to an augmented reality experience until the member 101 purchases one or more predetermined products from a vendor 106 that are associated with unlocking the augmented reality experience. For instance, access control system 100 may restrict access to the augmented reality experience until the member 101 purchases a particular type or brand of product from the vendor 106. Once the member 101 purchases a qualifying product, the member 101 may then be able to access the augmented reality experience to earn session points that can be redeem for other rewards.

At step 202, the member 101 provides their member identifier 118 to a point-of-sale device 104. For example, the member 101 may be in a convenience store purchasing one or more products (e.g. food or drinks) at the point-of-sale device 104. At some point during the transaction, the member 101 may provide their member identifier 118 to the point-of-sale device 104. A member identifier 118 is a code or identifier that is uniquely associated with a member 101. Examples of member identifiers 118 include, but are not limited to, phone numbers, email addresses, alphanumeric codes, bar codes, quick response (QR) codes, or any other suitable type of identifier that is assigned to a member 101. For instance, the member 101 may provide their member identifier 118 by entering their phone number on a user interface of the point-of-sale device 104. As another example, the member 101 may provide their member identifier 118 by scanning a card that contains their member identifier 118 at the point-of-sale device 104. As another example, the member 101 may provide their member identifier 118 by scanning a QR code that is displayed on a mobile application on their user device 102 at the point-of-sale device 104. In other examples, the member 101 may provide their member identifier 118 using any other suitable technique.

At step 204, the point-of-sale device 104 completes a transaction with the member 101 and send transaction information 120 to the access control device 108. In one embodiment, the transaction information 120 comprises the member identifier 118 for the member 101 and a list of items that were purchased. For example, the transaction information 120 may comprise a list of product identifiers corresponding with the products that were purchased by the member 101. Examples of product identifiers include, but are not limited to, product numbers, bar codes, product descriptions, or any other suitable type of identifier that uniquely identifies a product. In other embodiments, the transaction information 120 may further comprise a store identifier, a timestamp, payment card information, or any other suitable type of information that is associated with a transaction. For example, the transaction information 120 may comprise a store identifier that uniquely identifies the store where the member 101 made a purchase. As another example, the transaction information 120 may comprise a timestamp that indicates the day and time when the member 101 made a purchase. As another example, the transaction information 120 may comprise payment card information that indicates the type of payment card that the member 101 used to make a purchase.

At step 206, the access control device 108 receives the transaction information 120 and determines whether the member 101 has made a qualifying purchase that enables the member 101 to unlock or access an augmented reality experience. For example, the access control device 108 may compare product identifiers for the items identified in the transaction information 120 to a predetermined item list 114 that identifies products that can be purchased to unlock an augmented reality experience. Referring to FIG. 1 as an example, the item list 114 may comprises a list of product identifiers for products that can be purchased to unlock an augmented reality experience. In this example, the access control device 104 compares the product identifier in the transaction information to the product identifiers in the item list 114 to determine if any of the product identifier match.

In some embodiments, the access control device 108 may also use other transaction information 120 for determining whether the member 101 has made a qualifying purchase. For example, the access control device 108 may use a timestamp for the purchase to determine whether the purchase was made during a predefined time interval. As another example, the access control device 108 may use a store identifier to determine whether the purchase was made at a qualifying location. As another example, the access control device 108 may use payment card information to determine whether the purchase was made using a qualifying type of card. In other examples, the access control device 108 may determine whether the member 101 has made a qualifying purchase using any suitable combination of transaction information 120.

In response to determining that one or more product identifiers from the transaction information matches an item in the item list, the access control device 108 stores an authorization for the member identifier 118 to access the augmented reality experience in the account information 112 associated with the member 101. Account information 112 may comprise member identifiers 118, a cumulative number of session points for a member 101, augmented reality experience permission setting for one or more augmented reality experiences, and/or any other type of information associated with a member 101. Referring again to FIG. 1 as an example, the account information 112 links a member identifier 118 with a cumulative number of session points for a member 101 and a permission setting for an augmented reality experience. In this example, the account information 112 indicates that a first member 101 (shown as member one) has 2,000 cumulative session points and is authorized to access the augmented reality experience. The account information 112 also indicates that a second member 101 (shown as member two) has 100 cumulative session points and is not authorized to access the augmented reality experience. A member's 101 augmented reality experience permission setting may be configured by default to indicate that the member 101 is not authorized to access the augmented reality experience. When the access control device 108 stores the authorization for the member identifier 118 to access the augmented reality experience, the access control device 108 may change the a augmented reality experience permission setting to indicate that the member 101 is authorized to access the augmented reality experience. For example, the access control device 108 may change the augmented reality experience permission setting in the account information 112 from a locked state to an unlocked state.

Figure 4:
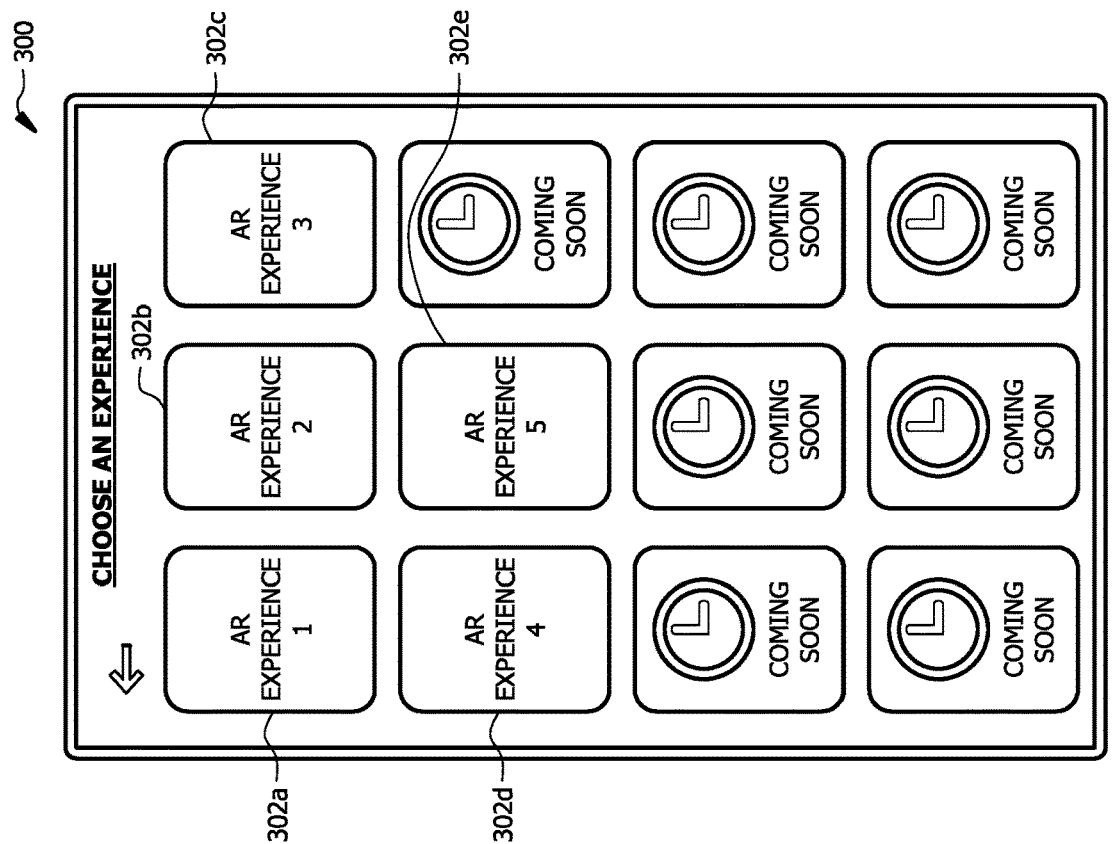
FIG. 4 is an example of a screenshot from a mobile application with unlocked augmented reality experiences.
Figure 3:
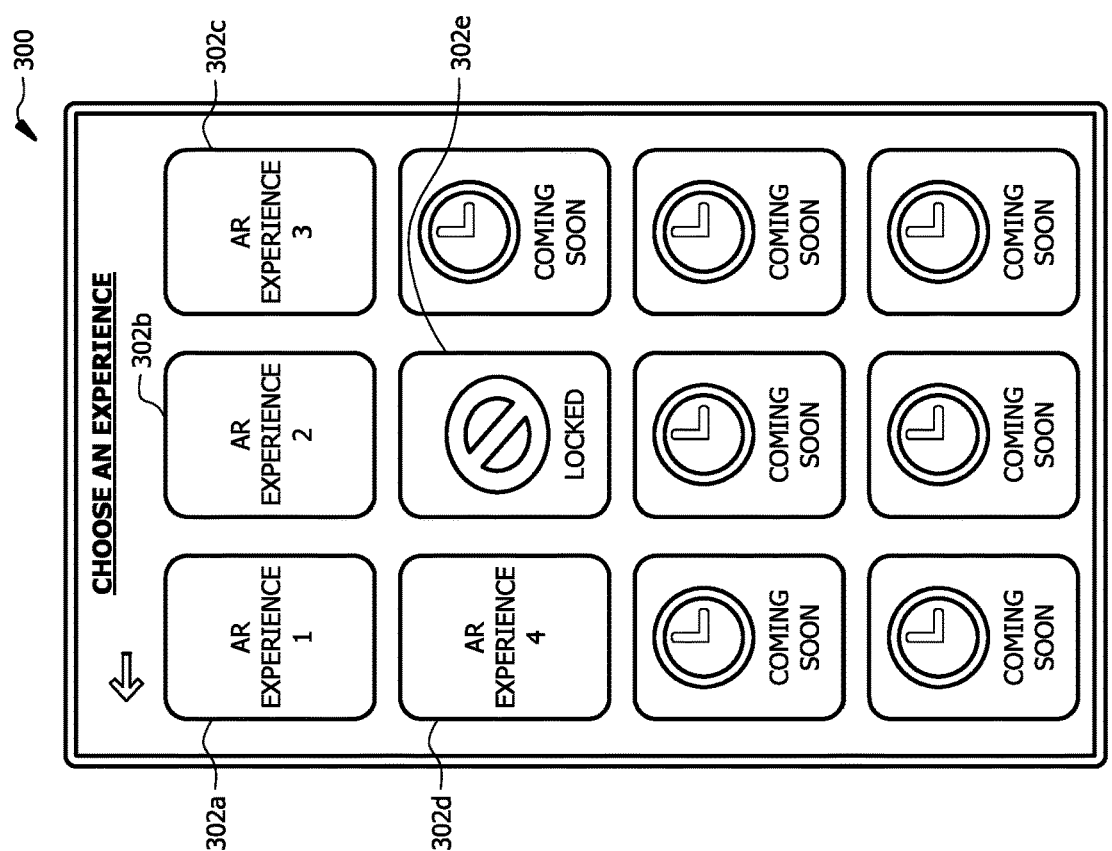
FIG. 3 is an example of a screenshot from a mobile application with a locked augmented reality experience.

When the augmented reality experience permission setting is in a locked state, the augmented reality experience may appear as locked or restricted in a mobile application on the member's 101 user device 102. Referring to FIG. 3 as an example, a mobile application 300 on the member's 101 user device 102 may allow the member 101 to access one or more augmented reality experiences (shown as augmented reality experiences 302A, 302B, 302C, 302D, and 302E). In this example, augmented reality experiences 302A-302D are in an unlocked state and are accessible to the member 101. However, augmented reality experience 302E is in a locked state and is in accessible to the member 101. In other examples, the mobile application 300 may represent locked and unlocked augmented reality experiences using any other suitable technique. When the augmented reality experience permission setting is in an unlocked state, the augmented reality experience may appear as unlocked or accessible on the mobile application on the member's 101 user device 102. Referring to FIG. 4 as an example, the augmented reality experiences 302A-302E are all in an unlocked state and are accessible to the member 101.

Figure 5:
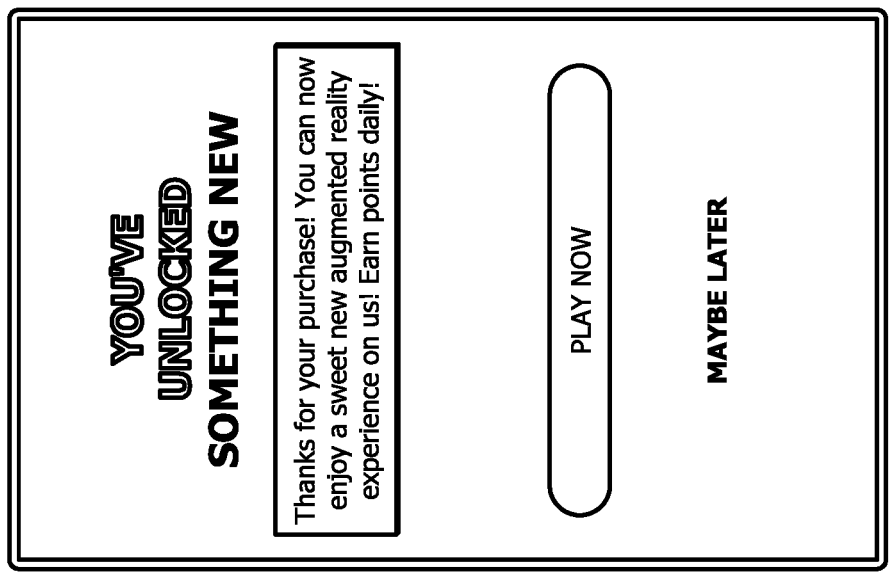
FIG. 5 is an example of a screenshot of a notification when an augmented reality experience is unlocked.

Returning to FIG. 2 at step 208, the access control device 108 sends a notification 122 to the member 101 that indicates that the member 101 has unlocked the augmented reality experience. For example, the access control device 108 may send a notification 122 to the member's 101 user device 102 that indicates that the member 101 has enabled access or unlocked the augmented reality experience based on their recent transactions. Examples of notifications 122 include, but are not limited to, text messages, short message service (SMS) messages, multimedia messaging service (MMS) messages, push notifications, application popup notifications, emails, or any other suitable type of notifications. Referring to FIG. 5 as an example, the notification 122 may be an application popup notification that informs the member 101 that they have unlocked an augmented reality experience. In one embodiment, the notification 122 may be configured to allow the member 101 to access the augmented reality experience by interacting with the notification 122. In this example, the member 101 may access the augmented reality experience by pressing the "play now" button. Otherwise, the member 101 may defer accessing the augmented reality experience by pressing the "maybe later" button.

Returning to FIG. 2 at step 210, the member 101 sends an access request 124 to the augmented reality host device 110 that comprises the member identifier 118. The member 101 may send the access request 124 to access to the augmented reality experience. For example, the member 101 may send the access request 124 via a mobile application on the user device 102. For instance, the mobile application may send the member identifier 118 to the augmented reality host device 110 when the member 101 accesses the mobile application or selects the augmented reality experience in the mobile application.

At step 212, the augmented reality host device 110 sends a verification request 126 to the access control device 108 that comprises the member identifier 118. The augmented reality host device 108 sends the verification request 126 to determine whether the member 101 is authorized to access the augmented reality experience based on their previous transaction history. In other words, the augmented reality host device 110 may send the verification request 126 to determine whether the member 101 has previously purchased a product that enables the member 101 to unlock and access the augmented reality experience.

At step 214, the access control device 108 sends a verification response 128 that indicates whether the user 101 is authorized to access the augmented reality experience. Here, the access control device 108 may check the account information 112 associated with the member 101 using the member identifier 118. For example, the access control device 108 may identify account information 112 that is linked with the member identifier 118 and may check whether the permission setting for the augmented reality experience indicates that the member 101 is authorized to access the augmented reality experience. For instance, the access control device 108 may determine whether the augmented reality experience permission setting is in an unlocked state or in a locked state. The access control 108 sends the verification response 128 that indicates that the member 101 is authorized to access the augmented reality experience when the augmented reality experience permission setting is in an unlocked state. Otherwise, the access control 108 sends the verification response 128 that indicates that the member 101 is not authorized to access the augmented reality experience when the augmented reality experience permission setting is in a locked state. In one embodiment, the verification response 128 may comprise a numeric value or a flag bit that indicates whether the member 101 is authorized to access the augmented reality experience.

At step 216, the augmented reality host device 110 determines whether the member 101 is authorized to access the augmented reality experience based on the verification response 128. For example, the augmented reality host device 110 may determine whether the member 101 is authorized to access the augmented reality experience based on a numeric value within the verification response 128. The augmented reality host device 110 terminates method 200 in response to determining that the member 101 is not authorized access the augmented reality experience. The augmented reality hosting device 110 is configured to restrict access to the augmented reality experience by default which means that the member 101 is unable to access the augmented reality experience until they are authorized by the access control device 108.

The augmented reality host device 110 proceeds to step 218 in response to determining that the member 101 is authorized access the augmented reality experience. Here, the augmented reality host device 110 receives a verification response 128 that indicates that the member 101 associated with the member identifier 118 is authorized to access the augmented reality experience. In this case, the augmented reality host device 110 enables access to the augmented reality experience for the member 101.

At step 218, the augmented reality host device 110 executes the augmented reality experience for the member 101. Executing the augmented reality experience allows the member 101 to interact with the augmented reality experience via their user device 102. As the member 101 interacts with the augmented reality experience, the augmented reality host device 110 is configured to determine a number of session points that the member 101 has earned based on their interactions with the augmented reality experience. Session points are points that are accumulated within the augmented reality experience. For example, session points may correspond with a score from a game.

In one embodiment, the augmented reality experience is a game that comprises a plurality of levels. In this case, the augmented reality host device 110 may be configured to determine when the member 101 completes a task in the game and to provide one or more session points based on the task that was completed by the member 101. For example, the augmented reality host device 110 may provide the member 101 with session points in response to the member 101 completing tasks or objective within a level. As another example, the augmented reality host device 110 may provide the member 101 with session points in response to the member 101 completing a level of the game.

In some embodiments, the game may comprise one or more levels that are inaccessible to the member 101 by default. In other words, the game may be configured with one or more locked levels by default. In this configuration, an inaccessible level may become accessible to the member 101 after the member 101 completes one or more tasks in the game. For example, an inaccessible level may become accessible to the member 101 after the member 101 completes a preceding level. As another example, an inaccessible level may become accessible to the member 101 after a predetermined amount of time has elapsed. For instance, the game may be configured to control the member's 101 progress in the game by sequentially unlocking levels after predetermined amounts of time have elapsed. In this example, once the member 101 completes a level, the game may be configured to unlock the next level after 5 minutes, 24 hours, 1 week, or any other suitable amount of time has elapsed.

In another embodiment, the augmented reality experience may comprise an image filter than can be applied to an image or used to capture an image on the member's 101 user device 102. In this case, the augmented reality host device 110 may be configured to determine that the member 101 has generated an image using the image filter, to determine that the member 101 is sharing the generated image, and to provide one or more session points in response to determining that the member 101 is sharing the generated image. As an example, the augmented reality experience may be a face filter that allows the member 101 to capture an image that overlays one or more image filters to modify the appearance of the member 101. Once, the member 101 has captured an image using the face filter, the member 101 may share the image on a social media account. In this example, the augmented reality host device 110 may provide the member 101 with session points after they capture the image or after they share the image on one or more of their social media accounts.

Figure 6:
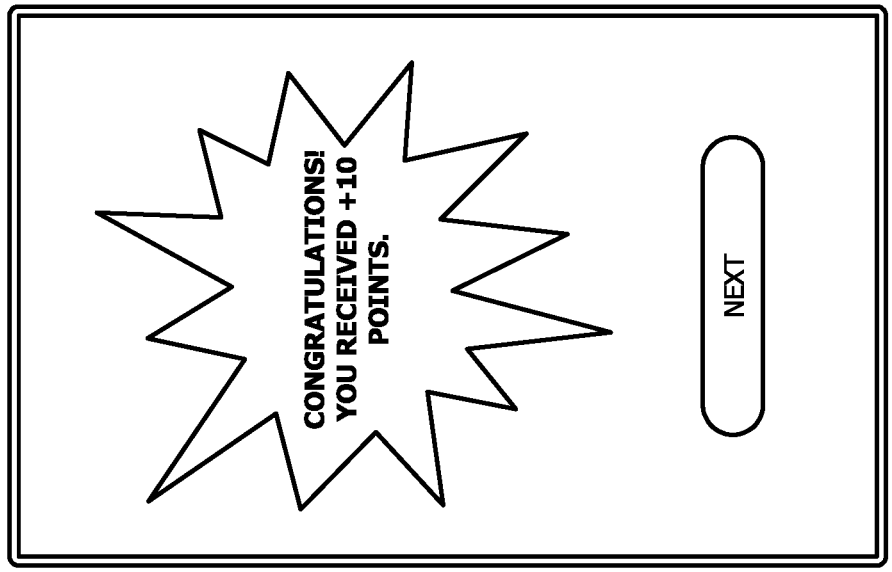
FIG. 6 is an example of a screenshot from an augmented reality experience when a member receives session points.

In one embodiment, the augmented reality host device 110 may be configured to provide a message or notification to the member 101 when they have earned session points. Referring to FIG. 6 as an example, the augmented reality host device 110 may present the member 101 with a message 600 (e.g. an application popup message) that indicates that the member 101 has earned session points. In this example, the message 600 informs the member 101 about the number of session points that they have earned based on their recent interaction with the augmented reality experience. In other examples, the message 600 may comprise any other suitable type of information.

Returning to FIG. 2 at step 220, the augmented reality host device 110 sends a progress message 130 to the access control device 108 that comprises the member identifier 118 for the member 101 and the number of session points that were earned by the member 101 from interacting with the augmented reality experience. Here, the augmented reality host device 110 sends the progress message 130 to update the member's 101 account with the additional session points that the member 101 earned while interacting with the augmented reality experience. For example, the augmented reality host device 110 may be configured to periodically send progress messages 130 to the access control device 108. As another example, the augmented reality host device 110 may be configured to send a progress message 130 after the member 101 has finished interacting with the augmented reality experience.

At step 222, the access control device 108 adds the received number of session points to a cumulative number of session points for the member 101 in their account information 112. The access control device 108 then determines whether the member 101 has qualified for any rewards based on their current cumulative number of session points. The access control device 108 may compare the member's 101 current cumulative number of session points to session point threshold values in a reward map 116. The reward map 116 identifies a plurality of rewards and a corresponding amount of session points that are required for obtaining a reward.

Referring to FIG. 1 as an example, the reward map 116 identifies a first reward that can be obtained when the member's 101 cumulative number of session points is greater than or equal to 800 session points, a second reward that can be obtained when the member's 101 cumulative number of session points is greater than or equal to 1200 session points, and a third reward that can be obtained when the member's 101 cumulative number of session points is greater than or equal to 1500 session points. In other example, rewards may be linked with any other suitable amount of session points. Examples of rewards may include, but are not limited to, discounts, coupons, free products, free services, loyalty points, or any other suitable type of reward. As an example, a reward may be a free product that can be retrieved from a vendor 106 associated with the access control device 110. As another example, a reward may be a discount for a product that is available from a vendor 106 associated with the access control device 110. As another example, a reward may an amount of loyalty points for a vendor 106 associated with the access control device 110. In this example, the loyalty points are redeemable by the vendor 106 associated with the access control device 110 for discounts, products, and/or services. In other examples, a reward may be for any other suitable type of discount, product, and/or service.

The access control device 108 identifies any available reward for the member 101 based on their current cumulative number of session points. For example, the access control device 108 may compare the current cumulative number of session points for the member 101 to each of the reward session point threshold values to determine whether the current cumulative number of session points is greater than or equal to any of the reward session point threshold values. In this example, the member 101 is eligible for a reward when the current cumulative number of session points is greater than or equal to any of a reward session point threshold value associated with the reward.

Figure 7:
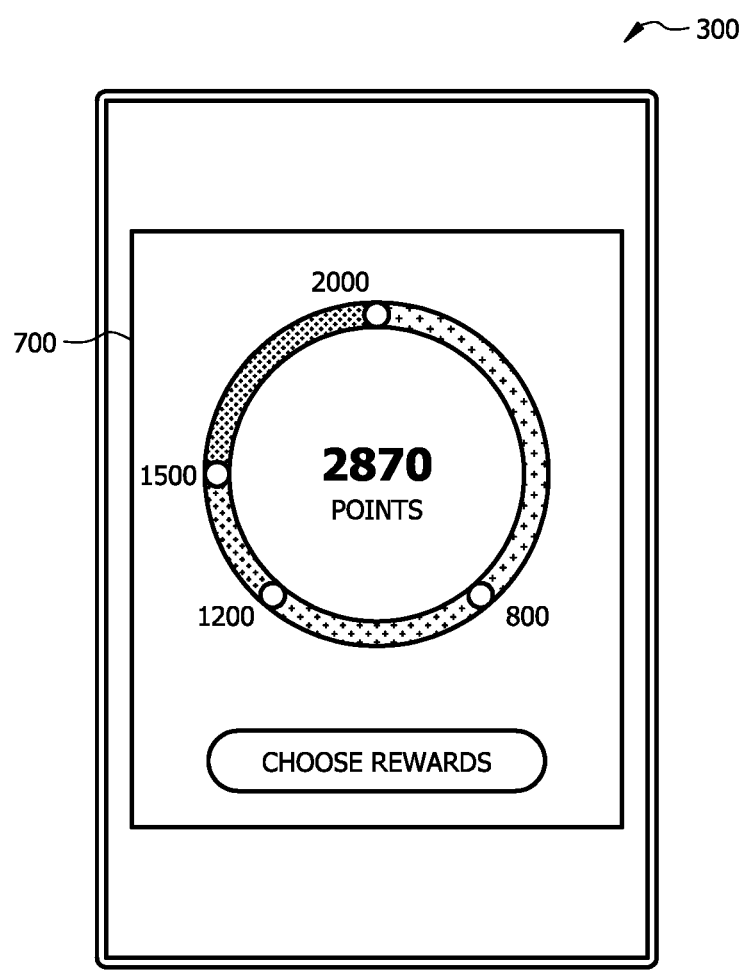
FIG. 7 is an example of a screenshot of cumulative number of session points for a member.

In one embodiment, the access control device 108 may be configured to allow the member 101 to select which reward they would like to redeem. Referring to FIG. 7 as an example, the member 101 may be able to view their current cumulative number of session points 700 from the mobile application 300 on their user device 102. In this example, the member 101 has 2870 session points. The feature allows the member 101 to see their progress towards different rewards. The application 300 may also allow the member 101 to identify which reward are available and to select any rewards they would like to redeem.

Returning to FIG. 2 at step 224, the access control device 108 sends reward information 132 to the member 101. For example, the access control device 108 may send the reward information 132 as a text message, an SMS message, a MMS message, a push notification, an application popup notification, an email, or any other suitable type of message. The reward information 132 comprises information for retrieving an identified reward such as an alphanumeric code, a barcode, or any other suitable type of information that allows the member 101 to retrieve the identified reward. As an example, the access control device 108 may generate an alphanumeric code for retrieving a reward. As another example, the access control device 108 may generate a barcode for retrieving a reward. Examples of barcodes include, but are not limited to, Universal Product Codes (UPCs) and two-dimensional barcodes (e.g. QR codes).

At step 226, the user device 102 determines whether the member 101 would like to replay or continue using the augmented reality experience. For example, the mobile application on the user device 102 may query the member 101 about whether they would like to continue playing or interacting with the augmented reality experience. In this example, the member 101 may press a button (e.g. a touchscreen button) to indicate whether they would like to continue using the augmented reality experience. The user device 102 may return to step 218 in response to determining that the member 101 would like to replay or continue using the augmented reality experience. Here, the member 101 may continue interacting with the augmented reality experience to earn additional session points.

The user device 102 may proceed to step 228 in response to determining that member 101 does not want to replay or continue using the augmented reality experience. At step 228, after the member 101 has finished using the augmented reality experience, the member 101 may retrieve their reward from a vendor 106 using the reward information 132. For example, the member 101 may retrieve their reward by providing the received reward information 132 to the point of sale device 104. For instance, the member 101 may use their user device 102 to present an alphanumeric code or bar code to the point-of-sale device 104 to retrieve their reward. As another example, the member 101 may retrieve their reward by providing their member identifier 118 to the point of sale device 104. In this example, access control device 108 may associate rewards for the member 101 with their member identifier 118. This allows the member 101 to retrieve their reward by providing their member identifier 118 to the point-of-sale device 104.

The point-of-sale device 104 uses the reward information 132 provided by the member 101 to complete a transaction for the member's 101 reward. As an example, the member 101 may receive reward information 132 that comprises a QR code that allows the member 101 to receive a free drink. The point-of-sale device 104 may scan the QR code from the member's 101 user device 102, validate the QR code, and may discount the cost of the drink for the member 101 in response to validating the QR code. In one embodiment, the point-of-sale device 104 may send a validation request 134 that comprises the reward information 132 to the access control device 108. In this case, the access control device 108 may validate the reward information 132 and may send a validation response 136 that indicates whether the reward information 132 is valid. The point-of-sale 104 may complete the transaction in response to receiving a validation response 136 that the reward information 132 is valid. In other embodiments, the point-of-sale device 104 may validate reward information 132 using any other suitable technique as would be appreciated by one of ordinary skill in the art.

Network Device Hardware Configuration

Figure 8:
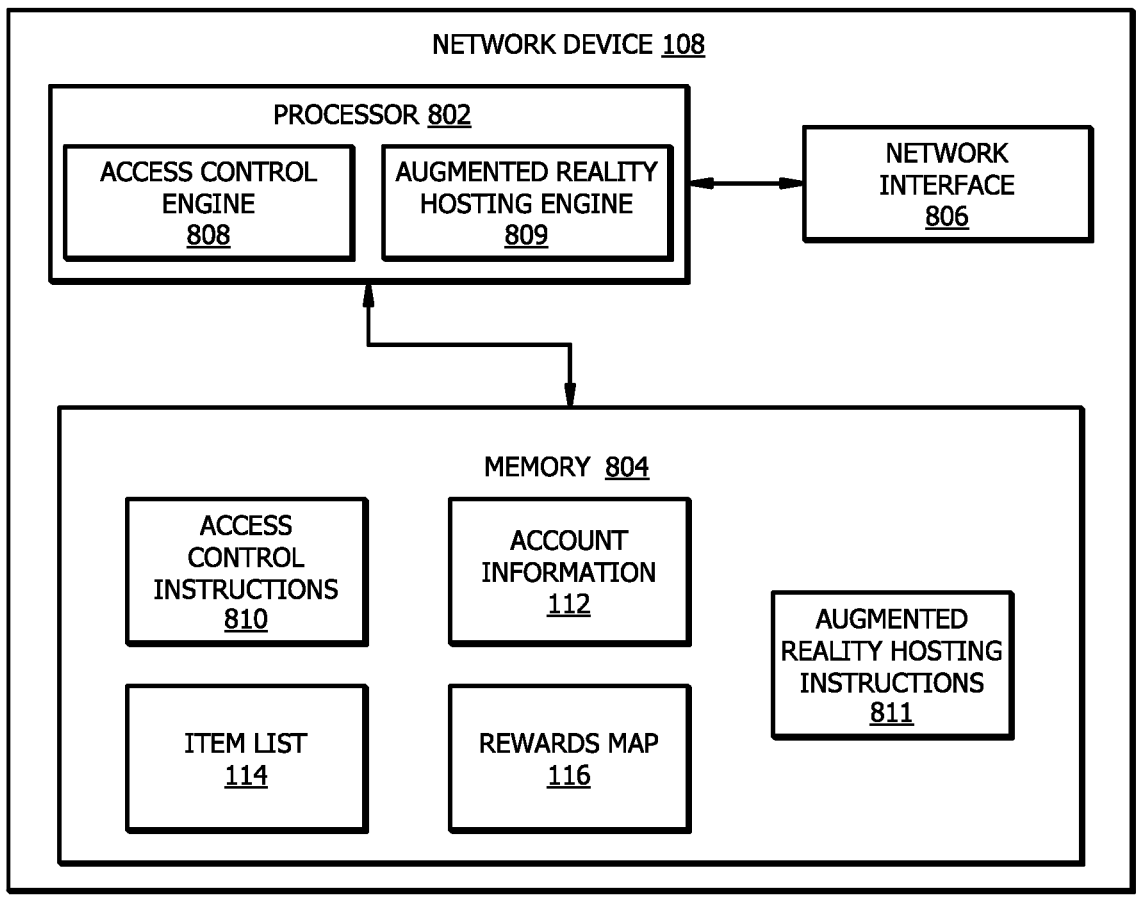
FIG. 8 is an embodiment of a network device configured to provide access control for an augmented reality experience.

FIG. 8 is an embodiment of a network device (e.g. access control device 108 or an augmented reality host device 110) configured to provide access control to an augmented reality experience. The network device 108 comprises a processor 802, a memory 804, and a network interface 806. The network device 108 may be configured as shown or in any other suitable configuration.

The processor 802 comprises one or more processors operably coupled to the memory 804. The processor 802 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 802 may be a programmable logic device, a microcontroller, a microprocessor, or any suitable combination of the preceding. The processor 802 is communicatively coupled to and in signal communication with the memory 804. The one or more processors are configured to process data and may be implemented in hardware or software. For example, the processor 802 may be 8-bit, 16-bit, 32-bit, 64-bit or of any other suitable architecture. The processor 802 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement an access control engine 808 and an augmented reality hosting engine 809. In this way, processor 802 may be a special purpose computer designed to implement the functions disclosed herein. In an embodiment, the access control engine 808 and the augmented reality hosting engine 809 are implemented using logic units, FPGAs, ASICs, DSPs, or any other suitable hardware. The access control engine 808 and the augmented reality hosting engine 809 are configured operate as described in FIGS. 1-2. For example, the access control engine 808 and the augmented reality hosting engine 809 may be configured to perform the steps of method 200 for the access control device 108 and the augmented reality hosting device 110, respectively, as described in FIG. 2.

The memory 804 comprises one or more disks, tape drives, or solid-state drives, and may be used as an over-flow data storage device, to store programs when such programs are selected for execution, and to store instructions and data that are read during program execution. The memory 804 may be volatile or non-volatile and may comprise read-only memory (ROM), random-access memory (RAM), ternary content-addressable memory (TCAM), dynamic random-access memory (DRAM), and static random-access memory (SRAM).

The memory 804 is operable to store access control instructions 810, augmented reality hosting instructions 811, account information 112, item lists 114, reward maps 116 and/or any other data or instructions. The access control instructions 810 and the augmented reality hosting instructions 811 may comprise any suitable set of instructions, logic, rules, or code operable to execute the access control engine 808 and the augmented reality hosting engine 809, respectively. The account information 112, the item lists 114, and the reward maps 116 are configured similar to the account information 112, the item lists 114, and the reward maps 116 described in FIGS. 1-2, respectively.

The network interface 806 is configured to enable wired and/or wireless communications. The network interface 806 is configured to communicate data between the network device 108 and other devices (e.g. point of sale device 104 and augmented reality host device 110), systems, or domain. For example, the network interface 806 may comprise a WIFI interface, a LAN interface, a WAN interface, a modem, a switch, or a router. The processor 802 is configured to send and receive data using the network interface 806. The network interface 806 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An access control system, comprising:
an access control device, comprising:
a first memory operable to store:
an item list identifying a plurality of items that can be purchased to unlock an augmented reality experience in a mobile application;
account information for a member, wherein the account information comprises a member identifier for the member; and
an access control engine implemented by a first processor operably coupled to the first memory, configured to:
receive transaction information identifying:
the member identifier; and
a purchased item;
compare the purchased item to items in the item list;
determine the purchased item matches an item in the item list;
store in the first memory an authorization for the member identifier to access the augmented reality experience in the account information for the member; and
an augmented reality host device in signal communication with the access control device, comprising:
an augmented reality hosting engine implemented by a second processor, configured to:
restrict access to the augmented reality experience;
receive an access request for the augmented reality experience comprising the member identifier;
send a verification request comprising the member identifier to the access control device;
receive a verification response indicating that the member associated with the member identifier is authorized to access the augmented reality experience in response to sending the verification request; and
enable access to the augmented reality experience for the member.

2. The system of claim 1, wherein:
the augmented reality experience is a game comprising a plurality of levels; and
the augmented reality hosting engine is further configured to:
determine the member has completed a task in the game; and
provide one or more session points to the member in response to determining that the member has completed the task in the game.

3. The system of claim 2, wherein:
a level from the plurality of levels is inaccessible to the member by default; and
the inaccessible level is configured to become accessible to the member after the member completes the task in the game.

4. The system of claim 1, wherein:
the augmented reality experience comprises an image filter; and
the augmented reality hosting engine is further configured to:
determine the member generated an image using the image filter;
determine the member is sharing the generated image; and
provide one or more session points to the member in response to determining that the member is sharing the generated image.

5. The system of claim 1, wherein the first processor is further configured to generate reward information that identifies a free product that can be retrieved from a vendor.

6. The system of claim 1, wherein the first processor is further configured to generate reward information that identifies a discount for a product from a vendor.

7. The system of claim 1, wherein:
the first processor is further configured to generate reward information that identifies an amount of loyalty points for a vendor; and
the loyalty points are redeemable by the vendor.

8. The system of claim 1, wherein the first processor is further configured to generate reward information that comprises a barcode associated with an identified reward.

9. The system of claim 1, wherein:
the access control engine is further configured to send a notification to a mobile device associated with the member; and the notification indicates that the member has enabled access to the augmented reality experience.

10. An access control method, comprising:
receiving transaction information identifying:
　a member identifier for a member; and
　a purchased item;
comparing the purchased item to items in an item list, wherein the item list item list identifies a plurality of items that can be purchased to unlock an augmented reality experience in a mobile application;
determining the purchased item matches an item in the item list;
storing an authorization for the member identifier to access the augmented reality experience in account information for the member;
receiving an access request for the augmented reality experience comprising the member identifier;
sending a verification request comprising the member identifier to an access control device;
receiving a verification response indicating that the member associated with the member identifier is authorized to access the augmented reality experience in response to sending the verification request; and
enabling access to the augmented reality experience for the member.

11. The method of claim 10, wherein:
the augmented reality experience is a game comprising a plurality of levels; and
further comprising:
　determining the member has completed a task in the game; and
　providing one or more session points to the member in response to determining that the member has completed the task in the game.

12. The method of claim 11, wherein:
a level from the plurality of levels is inaccessible to the member by default; and
the inaccessible level becomes accessible to the member after the member completes the task in the game.

13. The method of claim 10, wherein:
the augmented reality experience comprises an image filter; and
further comprising:
　determining the member generated an image using the image filter;
　determining the member is sharing the generated image; and
　providing one or more session points to the member in response to determining that the member is sharing the generated image.

14. The method of claim 10, further comprising generating reward information that identifies a free product that can be retrieved from a vendor.

15. The method of claim 10, further comprising generating reward information that identifies a discount for a product from a vendor.

16. The method of claim 10, further comprising generating reward information that identifies an amount of loyalty points for a vendor, wherein the loyalty points are redeemable by the vendor.

17. The method of claim 10, further comprising generating reward information that comprises a barcode associated with an identified reward.

18. The method of claim 10, further comprising sending a notification to a mobile device associated with the member, wherein the notification indicates that the member has enabled access to the augmented reality experience.

19. A device, comprising:
a memory operable to store account information for a member, wherein the account information comprises a member identifier for the member and an authorization for the member identifier to access an augmented reality experience; and
a processor communicatively coupled to the memory and configured to:
　restrict access to the augmented reality experience;
　receive an access request for the augmented reality experience comprising the member identifier;
　send a verification request comprising the member identifier to the access control device;
　receive a verification response indicating that the member associated with the member identifier is authorized to access the augmented reality experience in response to sending the verification request; and
　enable access to the augmented reality experience for the member.

20. The device of claim 19, wherein the processor is further configured to provide one or more session points to the member in response to determining that the member has interacted with the augmented reality experience.

* * * * *